July 9, 1940.  G. A. LYON  2,207,155
BUMPER GUARD
Filed May 4, 1938
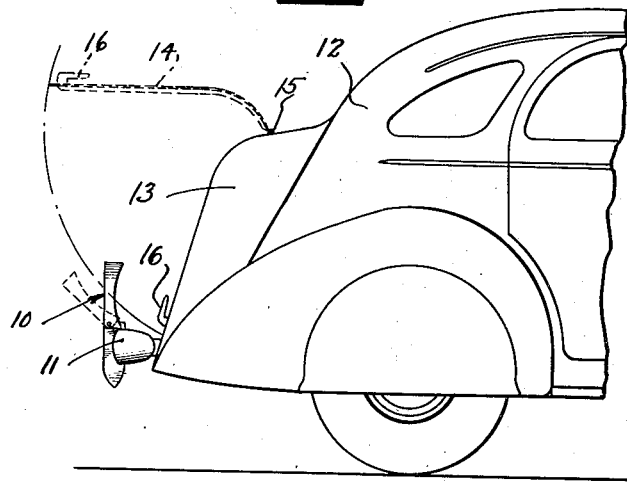
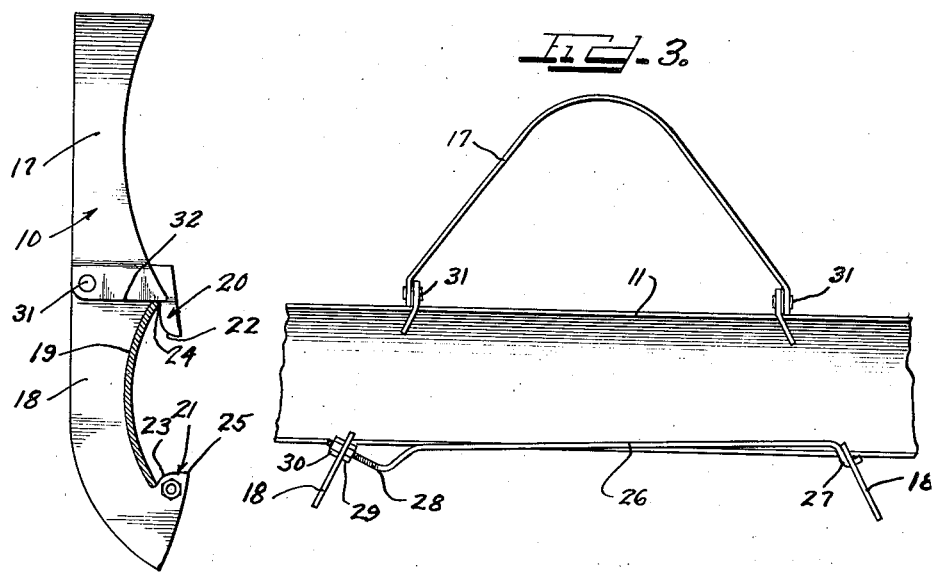
Inventor
GEORGE ALBERT LYON.
by Charles ︎ Atty︎s.

Patented July 9, 1940

2,207,155

UNITED STATES PATENT OFFICE 2,207,155

BUMPER GUARD

George Albert Lyon, Allenhurst, N. J.

Application May 4, 1938, Serial No. 205,888

3 Claims. (Cl. 293—55)

This invention relates to a snap-on ornamental bumper guard or impact member, and more specifically to an ornamental bumper accessory which is adapted to be snapped into desired position on a vehicle bumper to increase the protection afforded by the latter and in which the upper portion of the bumper accessory is arranged to be rocked outwardly and downwardly without removing the accessory from the bumper bar.

The ordinary motor vehicles of the present day are provided with a front and rear impact member which is commonly known as a "bumper" or "bumper bar." These impact members afford a substantial measure of protection to the front and rear of the motor vehicle but it has been found that in many instances a collision or accident occurs in which some obstacle extends over the top of the impact member or bumper and damages a portion of the car.

While it is desirable to equip both the front and rear bumpers of an automobile with a bumper guard, the use of such on the rear bumper has been restricted to a great extent due to the fact that most automobiles are provided with a rear luggage compartment having an outwardly opening door or closure member which is hinged at its top to the body of the vehicle. When bumper guards are mounted on a rear bumper and are constructed in such a manner as to give the desired degree of protection, it has been found that they interfere with the opening and closing of the door or closure member of the luggage compartment.

It has also been found in practice that occasionally some object will become hooked over the bumper guard which renders it very difficult to disengage the bumper guard therefrom. This is true whether the bumper guard is mounted on the rear bumper or the front bumper of the automobile.

Accordingly, it is an object of the present invention to provide a novel bumper guard, the upper portion of which can be rocked outwardly and downwardly when desired without removing the bumper guard from the bumper on which it is mounted. By providing a bumper guard which may be rocked outwardly and downwardly when desired, it will be apparent that the bumper guard will not interfere with the opening and closing of the closure member of the luggage compartment of the vehicle on which it is mounted and will also permit ready disengagement of the bumper guard from any object which has accidentally become hooked over it.

A further object of the present invention is to provide a novel snap-on ornamental bumper guard which includes provision for moving the upper portion of the bumper guard without removing the guard itself from the main bumper bar.

Another and further object of the present invention is to provide a novel bumper guard in which the upper portion is pivotally mounted on the lower portion, angular movement of the upper portion of the guard being limited in one direction by direct engagement of the upper portion of the bumper guard with the main bumper bar or impact member.

Another and still further object of the present invention is to provide a novel auxiliary impact member or bumper guard which is economical to manufacture and which is rugged and reliable in use.

The novel features which I believe to be characteristic of my invention are set forth with particularity in the appended claims. My invention itself, however, both as to its organization and manner of construction, together with further objects and advantages thereof, may best be understood by reference to the following description, taken in connection with the accompanying drawing, in which:

Figure 1 is an elevational view of the rear portion of an automobile equipped with a bumper guard embodying the novel features of the present invention;

Figure 2 is an enlarged elevational view of the bumper guard mounted on a vehicle bumper; and Figure 3 is a rear elevational view of the bumper guard as mounted on a vehicle bumper.

In Figure 1 of the drawing, a bumper guard 10 is shown mounted on the rear bumper 11 of an automobile 12. The automobile 12 includes the usual luggage compartment 13 which is provided with a door or closure member 14 pivotally mounted at its upper end 15 to the vehicle body. The usual latch handle of the door 14 is shown at 16.

As may be seen best in Figures 2 and 3 of the drawing, the bumper guard 10 comprises an inverted V-shaped unit including an inverted V-shaped upper member 17 and two lower leg portions or mounting members 18. The rear edge of each of the lower leg portions 18 is cut out, as at 19, to sit the outer contour of the bumper 11 and be intimately seated thereon in assembled position. At opposite extremities of the cut out portion 19, complementary teeth 20 and 21 are provided which are preferably formed as an integral part of the lower leg portions 18. Upper and lower complementary teeth 20 and 21 extend generally downwardly and upwardly respectively, the inner edge of each tooth being preferably a rounded orb, as at 22 and 23. As is clearly shown in Figures 2 and 3 of the drawing, these teeth 20 and 21 extend downwardly and upwardly respectively behind the bumper bar 11 when the bumper guard 10 is in mounted position thereon.

To properly understand the manner in which the bumper guard 10 is mounted and retained on the bumper 11, it is important to note that the lower leg portions 18 in their mounted position are disposed at a substantial angle to the vertical in their mounted position. It is because of this oblique disposition of the lower leg portions 18 that the hooking of the complementary teeth 20 and 21 over the bumper 11 is made possible. More specifically, the complementary teeth 20 and 21 are so arranged that the linear distance between the inner end of the tooth 20 as defined by the junction point 24 between tooth 20 and the cut out edge portion 19 of the highest point 25 of tooth 21 is greater than the overall vertical dimension of the bumper 11. It will thus be apparent that if the lower leg portion 18 of the bumper guard 10 is held in a substantially vertical position, the upper tooth may be hooked over the top of bumper 11 and the lower tooth 25 rocked under the lower edge of the bumper 11. From the above explanation it will be apparent to those skilled in the art that to mount the bumper guard 10 on the bumper 11 it is simply necessary to grasp the two lower leg portions 18 and pull them toward each other against the inherent resiliency of the inverted V-shaped upper portion 17 until the lower leg portions 18 are disposed in substantially a vertical position. The upper teeth 20 may then be hooked over the upper edge of the bumper 11 and the lower teeth 21 rocked under the lower edge of the bumper 11. After the teeth 21 have passed into a position behind the bumper 11, the lower leg portions 18 are permitted to snap back to the position shown in Figure 3 of the drawing. It will be noted that the position which the lower legs 18 assume when they are permitted to snap back into mounted position depends upon the distance between the inner ends of the teeth 20 and 21. The legs 18 are maintained in this position by the inherent resiliency of the upper portion 17 of the bumper guard 10.

Additional means may be provided, if desired, to keep the bumper guard 10 in its expanded position. Such a means is illustrated in the drawing as a rod 26 having one end bent as at 27 and the other end bent and threaded as at 28. The end 27 of rod 26 is arranged to extend through a suitable hole in one leg 18 and the opposite end 28 is arranged to extend through a similar hole in the opposite leg 18, a pair of threaded nuts 29 and 30 being provided for adjusting the spacing between the legs 18 and clamping the rod 26 into place. The upper portion 17 of the bumper guard 10 is pivotally mounted to two lower leg portions 18 in any suitable manner, such as by short rivets or studs 31. As may be seen best in Figure 2, the rivets or studs 21 fix the pivot point of the upper portion 17 of the bumper guard 10 at a point ahead of and slightly above the main bumper bar 11. The lower edge 32 of the upper portion 17 of the bumper guard 10 is arranged to extend over the top of the bumper bar 11 and rest thereagainst when the bumper guard 10 is in mounted position. It will thus be understood that while the upper portion 17 can be rocked outwardly and downwardly, as is indicated by the dotted lines in Figure 1, it cannot be rocked rearwardly or in a clockwise direction, as viewed in Figures 1 and 2. This is by reason of the fact that the lower edge 22 of the upper portion 17 engages the top edge of the main bumper bar 11. To those skilled in the mechanical arts, it will at once be apparent that when a sharp or heavy blow is applied to the upper part 17 of the bumper guard 10 at any point or points along its outer edge, the resultant torque forces will be transmitted to the bumper bar 11 through the rivets 31, the lower teeth 21, and the top edge of the bumper bar 11 through the rear lower edge 32 of the upper portion 17 of the bumper guard 10. It will further be apparent that by providing a bumper guard of the character herein described, the upper portion of the bumper guard may be rocked out of an interfering position either with the luggage compartment door of the automobile or for the purpose of disengaging itself from any object which may have become hooked thereover.

While I have shown a particular embodiment of my invention, it will, of course, be understood that I do not wish to be limited thereto, since many modifications may be made, and I therefore contemplate by the appended claims to cover all such modifications as fall within the true spirit and scope of my invention.

I claim as my invention:

1. A bumper guard comprising a pair of members each constructed and arranged to embrace a bumper, a third member connected to and joining said pair of members, and a fourth member connected to each of said pair of members and constructed and arranged to apply forces thereto tending to force said members apart, the points of connection of said third and fourth members being offset relative to each other.

2. As an article of manufacture, a bumper guard having spaced upright sections provided with vertical cut-out portions to receive the bumper bar, and lip means constructed and arranged to be angled under pressure into wedged retaining engagement with said bumper guard, said upright sections also being provided with a generally horizontally extending member connected thereto for effecting said angling of the lip means.

3. As an article of manufacture, a bumper guard constructed to be applied vertically to the bumper bar and to be angled under pressure into wedged retaining engagement with the bar, said guard having spaced angled portions movable in opposite directions to grip the bumper bar, and a horizontally extending member connected to said angled portions for applying pressure thereto and impelling said portions into operative gripping position.

GEORGE ALBERT LYON.